(12) United States Patent
Hohjoh

(10) Patent No.: US 8,576,288 B2
(45) Date of Patent: Nov. 5, 2013

(54) IMAGE PROCESSING UNIT, IMAGE PROCESSING METHOD, AND IMAGE PROCESSING PROGRAM

(75) Inventor: Daisuke Hohjoh, Narashino (JP)

(73) Assignee: Ricoh Company, Ltd., Tokyo (JP)

( * ) Notice: Subject to any disclaimer, the term of this patent is extended or adjusted under 35 U.S.C. 154(b) by 10 days.

(21) Appl. No.: 13/240,041

(22) Filed: Sep. 22, 2011

(65) Prior Publication Data

US 2012/0086829 A1 Apr. 12, 2012

(30) Foreign Application Priority Data

Oct. 7, 2010 (JP) ................................. 2010-227217

(51) Int. Cl.
*H04N 5/228* (2006.01)
*H04N 5/235* (2006.01)
*H04N 9/73* (2006.01)
*G06K 9/00* (2006.01)
*G06K 9/40* (2006.01)

(52) U.S. Cl.
USPC .................. 348/208.4; 348/208.5; 348/208.6; 348/222.1; 348/223.1; 382/107; 382/154; 382/275

(58) Field of Classification Search
USPC ........................... 348/220, 223, 225, 227, 229
See application file for complete search history.

(56) References Cited

U.S. PATENT DOCUMENTS

| | | | | |
|---|---|---|---|---|
| 7,706,601 | B2* | 4/2010 | Hamanaka | 382/154 |
| 7,847,823 | B2* | 12/2010 | Habuka et al. | 348/208.4 |
| 2009/0185721 | A1* | 7/2009 | Hiraga et al. | 382/107 |
| 2009/0295938 | A1* | 12/2009 | Nikkanen | 348/223.1 |
| 2010/0165207 | A1* | 7/2010 | Deng et al. | 348/620 |

FOREIGN PATENT DOCUMENTS

| | | |
|---|---|---|
| JP | 2002-27312 | 1/2002 |
| JP | 3935500 | 3/2007 |
| JP | 4480760 | 3/2010 |

* cited by examiner

*Primary Examiner* — James M Hannett
*Assistant Examiner* — Padma Haliyur
(74) *Attorney, Agent, or Firm* — Oblon, Spivak, McClelland, Maier & Neustadt, L.L.P.

(57) ABSTRACT

An image processing unit includes a memory unit, a comparative image generator to generate a comparative image from a non-reference image, an image divider to divide a reference image, a non-reference image, and a comparative image into image blocks of a predetermined size, a motion data calculator to calculate motion data between the reference image and comparative image, an average calculator to calculate an average of pixel output values for each image block of the reference image and the comparative image, a threshold determiner to determine a threshold for synthesis determination according to the average of pixel output values of an image block of the reference image, a synthesis determiner to determine whether or not the image blocks of the reference image and of the non-reference image are suitable for synthesis, and a ratio determiner to determine a synthesis ratio of the image blocks determined as suitable for synthesis.

18 Claims, 9 Drawing Sheets

FIG. 6A

| AVERAGE | THRESHOLD |
|---|---|
| — | — |
| 501 | 11 |
| 502 | 11.01 |
| 503 | 11.02 |
| — | — |
| 2000 | 22 |
| 2001 | 22.001 |
| 2002 | 22.002 |
| — | — |

FIG. 6B

| AVERAGE | THRESHOLD |
|---|---|
| 100 | 5 |
| 500 | 11 |
| 1000 | 15.5 |
| 1500 | 18 |
| 2000 | 22 |
| 3000 | 27 |
| 4000 | 31 |

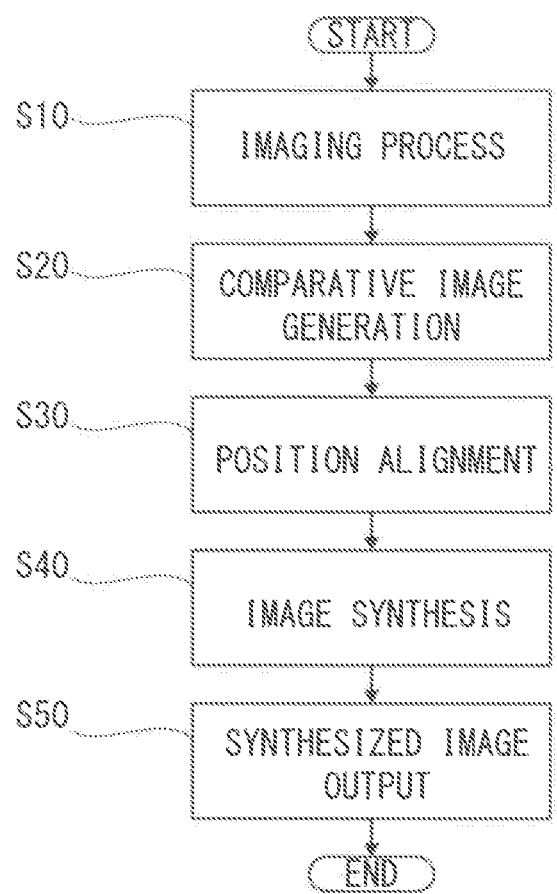

IMAGE PROCESSING UNIT, IMAGE PROCESSING METHOD, AND IMAGE PROCESSING PROGRAM

CROSS REFERENCE TO RELATED APPLICATION

The present application is based on and claims priority from Japanese Patent Application No. 2010-227217, filed on Oct. 7, 2010, the disclosure of which is hereby incorporated by reference in its entirety.

BACKGROUND OF THE INVENTION

1. Field of the Invention

The present invention relates to an image processing unit which can correct blurs and noise in an image including a moving subject by image synthesis. In particular, it relates to an image processing unit, an image processing method, and an image processing program which can accurately detect a motion in images to be synthesized with different brightness and generate images with good tone representation.

2. Description of the Prior Art

There are known digital cameras having various functions, taking advantage of high-speed operation of an image sensor such as CMOS. For example, one of them can continuously record five or more images per second or another one can shoot moving pictures at 1,000 fps or more. Such digital cameras adopt a dynamic range expansion technique in which dark to light portions of images captured with different exposure are synthesized at an arbitrary mix ratio to generate good images in expanded tone.

Meanwhile, another type of known digital camera includes an image processing unit to synthesize continuous images for the purpose of removing blurs due to camera shakes or noise in images captured with a long time exposure and preventing the occurrence of ghosts. By image synthesis, it is able to average random noise and reduce noise due to camera shakes or shooting in a dark condition.

To synthesize continuous images, it is necessary to align the positions of the images, the position of one image as a reference image with those of other images as comparative images. For synthesizing images including a completely still subject, the position alignment can be simply conducted by making the sizes of the images the same. However, for synthesizing images including a moving subject, it is necessary to first determine a direction in which the subject is moving and align the positions of the images in accordance with the motion of the subject. Without the motion of the subject taken into account, image synthesis will increase blur and noise in the images. In view of the above, Japanese Patent No. 3935500, for example, discloses an image processing unit which determines the motion of a subject before image synthesis and synthesizes images while aligning the positions of the images according to information on the subject's motion.

By combining the dynamic range expansion with the subject's motion detection and position alignment, it is made possible to effectively prevent blurs and ghosts in images, generate high quality images and improve the usability of users.

However, the dynamic range expansion does not include the position alignment needed for the images including a moving subject and is used for images with different brightness or exposure. Since the position alignment in the above document can be conducted only on images with the same brightness, it is very difficult to synthesize images with different brightness by combining the above processings, aiming for blur correction.

SUMMARY OF THE INVENTION

An object of the present invention is to provide an image processing unit, an image processing method, and an image processing program which can synthesize continuous images for the purpose of blur correction by adjusting the brightness of the images to be constant, using the brightness-adjusted images for synthesis determination, and synthesizing images having not been subjected to brightness adjustment.

Another object of the present invention is to provide an image processing unit, an image processing method, and an image processing program which can expand the dynamic range by dynamically deciding a image synthesis ratio and correct blurs in images by aligning the positions of the images.

According to one aspect of the present invention, an image processing unit includes a memory unit in which continuously captured images including a reference image and a non-reference image are stored, a comparative image generator configured to generate a comparative image from the non-reference image on the basis of photographic control data on the reference image and photographic control data on the non-reference image, an image divider configured to divide each of the reference image, non-reference image, and comparative image into image blocks of a predetermined size, a motion data calculator configured to calculate motion data between the reference image and the comparative image for associating the image blocks of the reference image with the image blocks of the comparative image, an average calculator configured to calculate an average of pixel output values for each image block of the reference image and for each image block of the comparative image associated with each other by the motion data, a threshold determiner configured to determine, on the basis of the average of pixel output values of an image block of the reference image, a threshold used for determining whether or not the image block of the reference image and an image block of the non-reference image are suitable for image synthesis, a synthesis determiner configured to compare the threshold for the image block of the reference image to be synthesized with a difference in averages of the pixel output values between the image block of the reference image and the image block of the comparative image, and determine, on the basis of a result of the comparison, whether or not the image block of the reference image and the image block of the non-reference image are suitable for image synthesis, and a ratio determiner configured to determine, on the basis of the average of the pixel output values of the image block of the reference image, a ratio of synthesis of the image blocks of the reference image and non-reference image determined as suitable for image synthesis.

BRIEF DESCRIPTION OF THE DRAWINGS

Features, embodiments, and advantages of the present invention will become apparent from the following detailed description with reference to the accompanying drawings:

FIGS. 6A, 6B are examples of threshold tables used in the image processing method according to one embodiment of the present invention;

FIG. 7 is a flowchart for an example of the image processing method;

DETAILED DESCRIPTION OF THE PREFERRED EMBODIMENT

Hereinafter, one embodiment of the present invention will be described in detail with reference to the accompanying drawings. An imaging device incorporating an image processing unit according to one embodiment of the present invention will be described by way of example.

Figure 1:
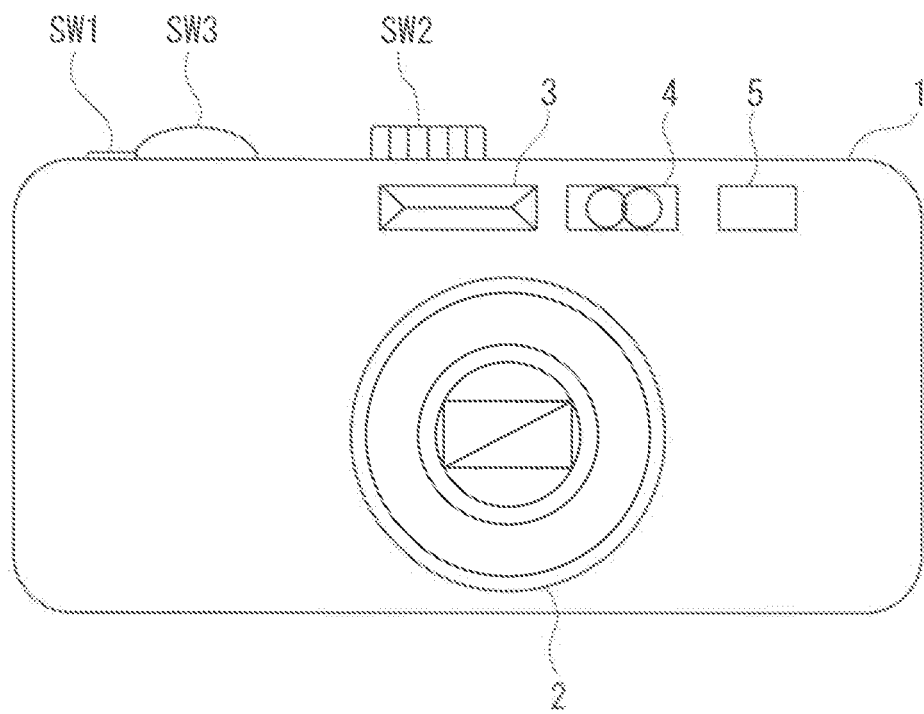
FIG. 1 is a front view of an example of an imaging device incorporating an image processing unit according to one embodiment of the present invention.

FIG. 1 is a front view of the exterior of an imaging device including the image processing unit. The imaging device 1 comprises a lens barrel unit 2 containing a zoom lens and a focus lens, a stroboscopic unit 3, a ranging unit 4 to measure a distance to a subject, and a viewfinder 5 on the front face. It includes on the top face a shutter button SW1, a mode dial switch SW2 with which a photographic mode is selected, and a jog dial switch SW3. By manipulation of the shutter button SW1, the image of a subject is captured into a not-shown image sensor via various lenses in the lens barrel unit 2 and stored as image data in a not-shown memory. Multiple images are continuously stored by a single imaging operation, for example, two continuous image data can be stored by a single operation of the shutter button SW1.

Figure 2:
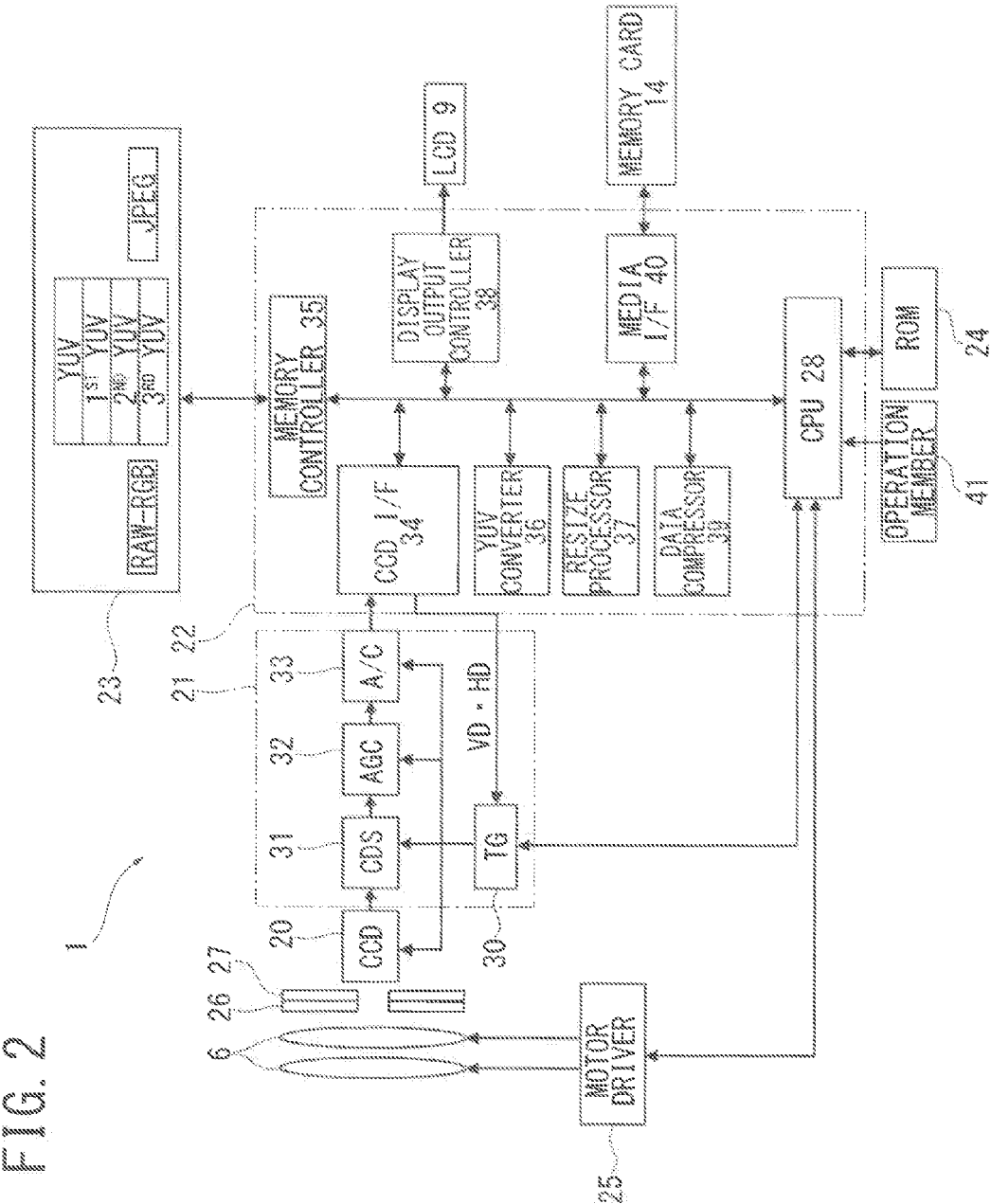
FIG. 2 is a block diagram of the structure of the imaging device in FIG. 1 by way of example.

FIG. 2 shows an example of the system structure of the imaging device 1 according to the present embodiment. In FIG. 2 the imaging device 1 comprises a CCD 20 as a solid image sensor on which the image of a subject incident via an imaging lens 6 is formed, an analog front end (AFE) 21 to convert analog RGB image signals from the CCD 20 into digital signals, a signal processor 22 to process the digital signals output from the AFE 21, an SDRAM 23 in which data is temporarily stored, an ROM 24 in which a control program and else are stored, and a motor driver 25.

The lens barrel unit 2 includes the imaging lens 6 including a zoom lens and a focus lens, a diaphragm unit 26, and a mechanical shutter unit 27 which are driven by the motor driver 25. The motor driver 25 is controlled by a drive signal from a CPU 28 of the signal processor 22.

RGB filters are arranged on the pixels of the CCD 20 to output analog RGB image signals in conformity with three original RGB colors. The AFE 21 includes a timing generator (TG) 30 to drive the CCD 20, a correlated double sampling (CDS) 31 to sample the analog RGB image signals from the CCD 20, an analog gain controller (AGC) 32 to adjust the gain of the image signal sampled in the CDS 31, and an A/D converter 33 to convert the gain-adjusted image signal into digital data (hereinafter, RAW-RGB data).

The signal processor 22 outputs a horizontal synchronous signal (HD) and a vertical synchronous signal (VD) to the timing generator 30 of the AFE 21. It includes a CCD interface (I/F) 34 to receive the RAW-RGB data from the A/D converter 33 of the AFE 21 in accordance with these synchronous signals, a memory controller 35 to control the SDRAM 23, a YUV converter 36 to convert the received RAW-RGB data into image data in recordable or displayable YUV format, a resize processor 37 to change the size of an image in accordance with the size of image data displayed or stored, a display output controller 38 to control the display output of image data, a data compressor to compress image data in JPEG format, a media interface (I/F) to write/read image data to/from a memory card 14, and the CPU 28 to control the entire system of the imaging device 1 by the control program stored in the ROM 24 in response to a manipulation of an operation member 41.

The operation member 41 is comprised of the shutter button SW1, a power button, a shooting/reproducing switch dial, a wide angle zoom switch, a telephoto zoom switch, a menu button, and an OK button (not shown). Upon a user's manipulation of the respective switches and buttons of the operation member 41, predetermined operation signals are input to the CPU 28.

In the SDRAM 23 the RAW-RGB data received by the CCD I/F 34, the YUV data converted in the YUV converter 36 and the compressed data in JPEG format by the data compressor 39 are stored. The YUV data are data in a format to represent colors based on brightness data (Y), color difference (U) between the brightness data and blue data, and color difference (V) between the brightness data and red data.

Next, an example of the operation of the imaging device 1 is described. First, images of a subject through the imaging lens 6 are photo-electrically converted into image data on the CCD 20, subjected to A/D conversion and gain adjustment in the AFE 21, and temporarily stored in the SDRAM via the signal processor 22. Then, they are subjected to motion detection calculation, image synthesis determination, and synthesis ratio calculation, thereby generating a single synthesized image. The generated synthesized image is converted into an image in JPEG format by the YUV converter 36 and the data compressor 39 and stored in the memory card 14 via the media I/F 40 or stored in a not-shown built-in memory of the imaging device 1.

Figure 3:
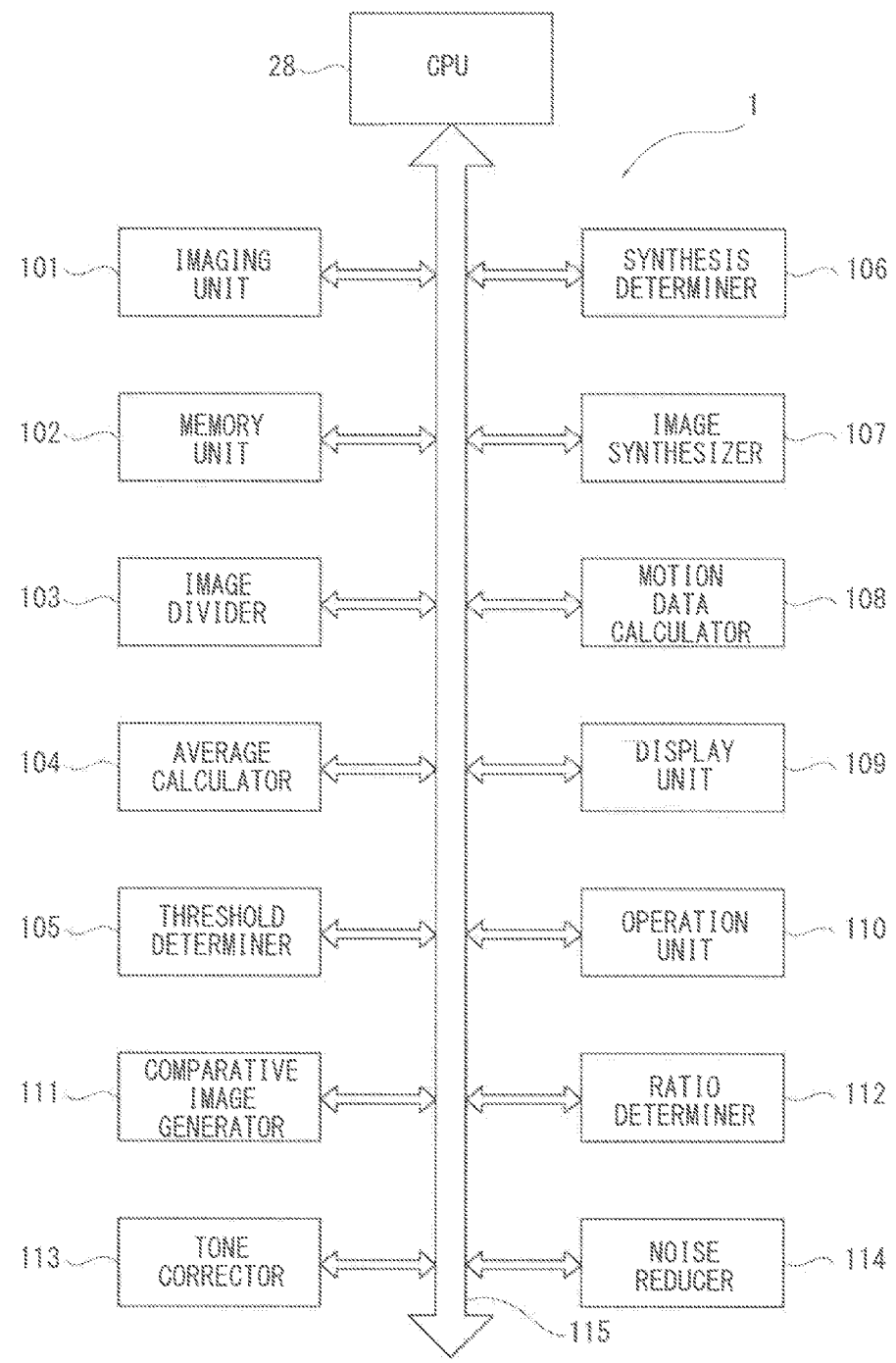
FIG. 3 is a block diagram of an example of a control system used in the imaging device.

Next, referring to FIG. 3, the functions of the imaging device 1 are described in detail by way of example. The elements of the imaging device 1 in FIG. 3 are connected with the CPU 28 via a data bus 115.

An imaging unit 101 is configured to convert the image of a subject captured via the optical system to digital data and generate a file in a predetermined recording format. Note that herein, this file is referred to as an image. The imaging unit 101 continuously captures a predetermined number of images, for example, 2.

A memory unit 102 stores continuous images generated by the imaging unit 101. An image divider 103 is configured to divide the image stored in the memory unit 102 into image blocks of a predetermined size, for example, 32 by 32 pixels.

An average calculator 104 is configured to calculate the average of output values of pixels included in each image block divided by the image divider 103. The average of the pixel output values is, for example, the average of the respective output values of R pixels, G pixels, B pixels (hereinafter, RGB average value), the average of brightness data of all the pixels, and the average of the sums of outputs values of the R pixels, G pixels, B pixels (hereinafter, RGB average sum).

A threshold determiner 105 is configured to determine, according to the average of a reference image calculated by the average calculator 104, a threshold used for determining image synthesis. The reference image refers to one of the continuous images stored in the memory unit 102. The images other than the reference image are referred to as non-reference images. In the present embodiment the reference image is a first captured image among the continuous images. However, it should not be limited thereto. Alternatively, it can be an image with a highest degree of focus.

The threshold is used for determining the suitability for image synthesis of each image block and differs in accordance with the average of pixel output values of an image block in question. The smaller the average, the smaller the threshold, and the larger the average, the larger the threshold. The reason why the threshold is changed in accordance with the average of the pixel output values is described in the following.

In general, there are two kinds of noise occurring in an image sensor, one depending on the magnitude of output and the other not depending thereon. The noise depending on the magnitude of output is optical shot noise, charge transfer noise, and noise due to noise in operational amplifier, for example. The optical shot noise occurs due to the quantum efficiency of a photo diode and the magnitude thereof depends on the number of photons. Even ideally illuminated at the same light amount for the same length of time, the output of the photo diode varies, and the higher the output, the greater the variation. That is, even when the same subject is shot at a plurality of times under the same condition, the output of the image sensor is not always constant. Because of this, the expected values of the differences between two images captured under the same condition will be different between dark portions having low outputs and bright portions having high outputs. This causes a problem in determining the suitability for image synthesis using the same threshold for the dark and bright portions. In the same scene the output of a dark portion with low brightness is likely to be below the threshold while that of a bright portion with high brightness is likely to exceed the threshold. Since the image portion having the output lower than the threshold is subjected to image synthesis but that having the output higher than the threshold is not, image crash may occur in a generated image such as a ghost in the dark portion and noise in the bright portion.

Figure 4:
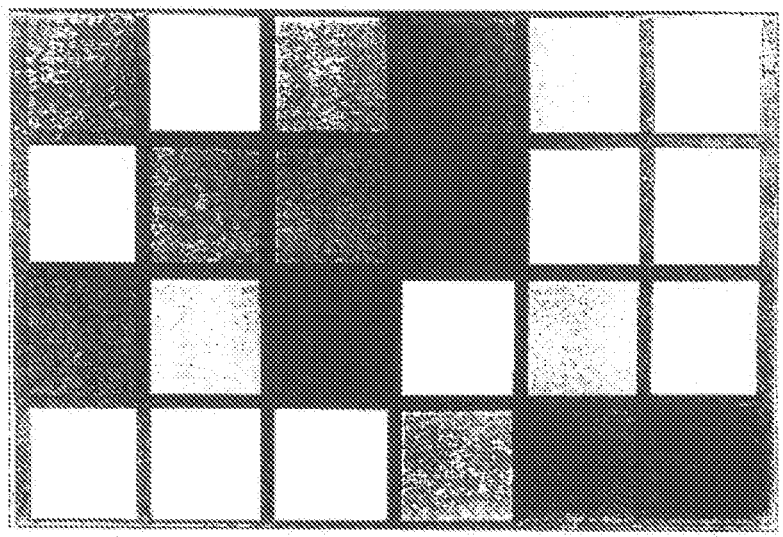
FIG. 4 shows an example of the image of a Macbeth chart used for selecting a threshold in an image processing method according to one embodiment of the present invention.

In view of the above, in the present embodiment, by calculating a distribution in difference values using continuous images of the Macbeth chart shown in FIG. 4, the threshold can be optimally set in accordance with the outputs of a subject based on the distribution. The Macbeth chart is shot at plural times under the same condition and settings with a digital camera on a tripod.

Figure 5A:
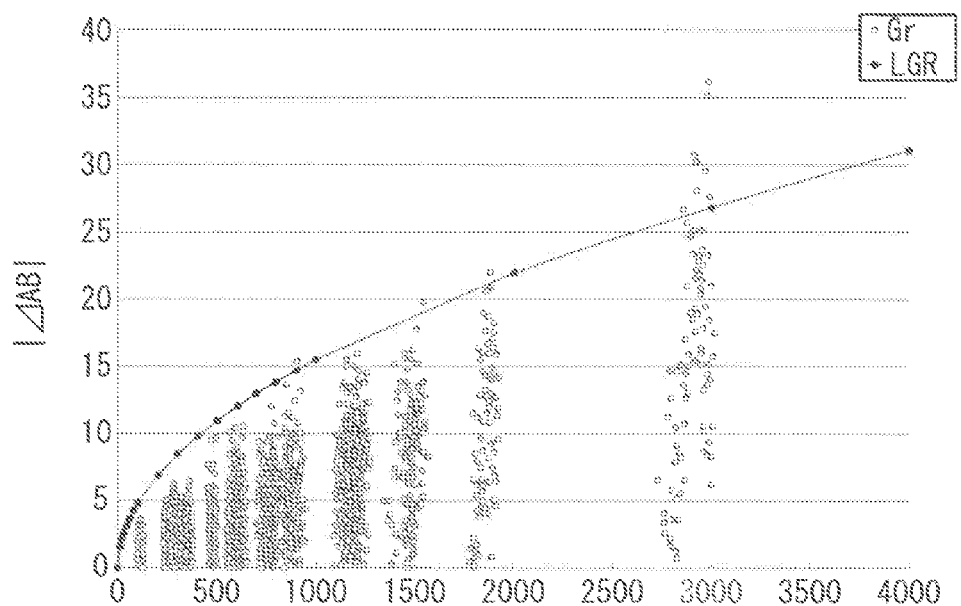
FIGS. 5A, 5B are graphs showing a distribution in difference values of continuous images of the Macbeth chart.
Figure 5B:
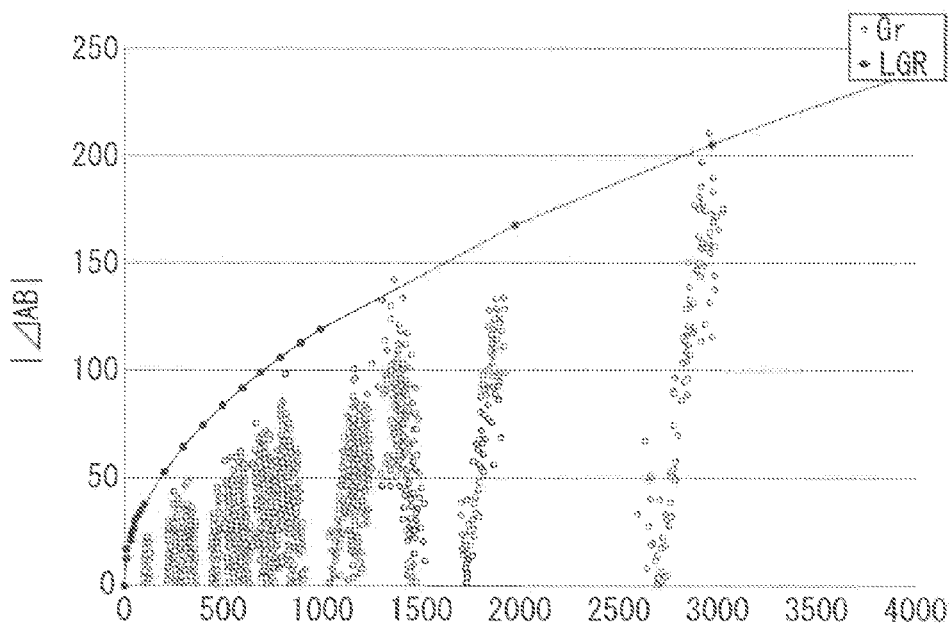

FIGS. 5A, 5B are graphs in which differences in the averages of the same positions of image blocks of two continuous images of the Macbeth chart in FIG. 4 are plotted. The abscissa axis shows pixel brightness or output values and the vertical axis shows differences. FIG. 5A is a graph at ISO sensitivity as amount of gain supplied to the image sensor being 100 while FIG. 5B is a graph at ISO sensitivity being 1,600. As apparent from the graphs, the differences are smaller in the dark portion and larger in the bright portion. How large the differences will be a matter of probability, and a variation in the differences of the bright portion is larger than that of the dark portion.

In FIGS. 5A, 5B the distribution in the differences takes a vertically long form. This is because the Macbeth chart in FIG. 4 consists of multiple rectangular images certain regions of which are colored with the same color so that the brightness of each rectangular image or patch falls within a predetermined range. As apparent from the graphs, the expected values of the differences are not dependent on the color of each patch and have almost no dependency on the light source. However, this does not hold true for a light source generating flickers since the absolute values of the outputs thereof vary. Further, S/N ratio varies in accordance with ISO sensitivity and the differences vary in accordance with ISO sensitivity.

The curves in FIGS. 5A, 5B are approximate curves calculated from the distribution in the differences and the optimal threshold for each pixel value can be specified from the approximate curves. Thus, the curves represent thresholds. When the difference in pixel output values is below the curve, the pixels are suitable for image synthesis but when it exceeds the curve, the pixels are unsuitable for image synthesis. The imaging device 1 according to the present embodiment is configured to pre-store a threshold table in a nonvolatile work memory with a predetermine structure. FIGS. 6A, 6B are examples of the threshold table containing the thresholds and the averages of pixel output values in association with each other. A large number of thresholds corresponding to every possible average of the pixel output values can be stored as shown in FIG. 6A; however it largely occupies the memory area. Preferably, the threshold table can contain thresholds corresponding to representative averages as shown in FIG. 6B, and the other thresholds can be calculated by interpolation. Alternatively, a number of threshold tables in FIG. 6B for each ISO sensitivity can be prepared since the magnitude of the average varies with ISO sensitivity (FIG. 5B) or they are prepared for the respective RGB pixels to more accurately determine image synthesis by averaging the outputs for the respective RGB pixels.

Returning to FIG. 3, a synthesis determiner 106 is configured to compare the threshold determined by the threshold determiner 105 with the difference in the averages of pixel output values of each image block of the reference image and the comparative image. When the difference is smaller than the threshold, it sets a flag indicating that the image block of the reference image in question and that of the corresponding image are suitable for synthesis. Flags are stored in a not-shown work memory of the imaging device 1 in association with identification data of the image blocks.

An image synthesizer 107 is configured to synthesize the image blocks of the reference image and non-reference image with the flag set. After the synthesizing process, if there is any image among the continuous images stored in the memory unit 12 which remains to be subjected to image synthesis, the image is set to a comparative image and the synthesized image is set to a new reference image, and the synthesis determiner 106 repeats synthesis determination process.

A motion data calculator 108 is configured to calculate motion data to determine relations between the respective image blocks of the reference image and comparative image. The motion data refers to the amount of horizontal and vertical displacements of the comparative image from the reference image. For example, it can be motion vector representing a parallel moving amount as a relative displacement between the reference image and comparative image or affine parameter for detecting motion as image rotation with a high degree of freedom. The motion data between the reference image and comparative image can be calculated by conducting step-by-step block matching on images from one with low resolution to one with high resolution after multi-resolution process to an input image, to find accurate affine parameters.

A display unit 109 displays image data and operation menus. An operation unit 110 detects inputs to the shutter button SW1 and the mode dial SW2 and provides the CPU 28 triggers to start predetermined operations.

A comparative image generator 111 is configured to generate comparative images used in the calculation of motion data by the motion data calculator 108. The comparative images are non-reference images with brightness set in accordance with that of the reference image.

A ratio determiner 112 is configured to calculate the synthesis ratio at which the reference image and non-reference image are synthesized by the image synthesizer 107 in accordance with the average of pixel output values of an image block of the reference image.

A tone corrector 113 is configured to conduct a simple tone correction to an image block determined as unsuitable for synthesis by the synthesis determiner 106.

A noise reducer 114 is configured to remove noise from each image block tone-corrected by the tone corrector 113 in order to reduce image degradation in dark portions due to noise.

The respective elements above are operated by the control program stored in the ROM 24 and data processing by the CPU 28.

Next, an image processing method executed by the image processing unit according to the present embalment is described with reference to a flowchart in FIG. 7 by way of example.

In step S10 continuous images of a subject captured by the imaging unit 11 are stored in the memory unit 102. Herein, the number of continuous images is set to 2. One of the two images is a reference image captured at proper exposure set by the normal auto exposure control and the other is a non-reference image captured at brightness twice as large as that of the reference image. The brightness of the non-reference image twice as large as that of the reference image can be realized by adjusting any of photographic control data such as aperture diaphragm, exposure time, and ISO sensitivity.

In step S20 the comparative image generator 111 multiples the pixel output value of the entire non-reference image by 0.5 to generate a comparative image with brightness equal to that of the reference image. In step S30 the motion data calculator 108 calculates motion data to determine a relation between the reference image and the comparative image and aligns the positions thereof using the motion data. The position alignment in step S30 is to correct displacement of the comparative image from the reference image using the motion data.

In step S40 the reference image and non-reference image are synthesized, which will be described in detail in the following. The image synthesizer 107 synthesizes the images in step S40 and outputs a synthesized image in step S50.

Figure 8:
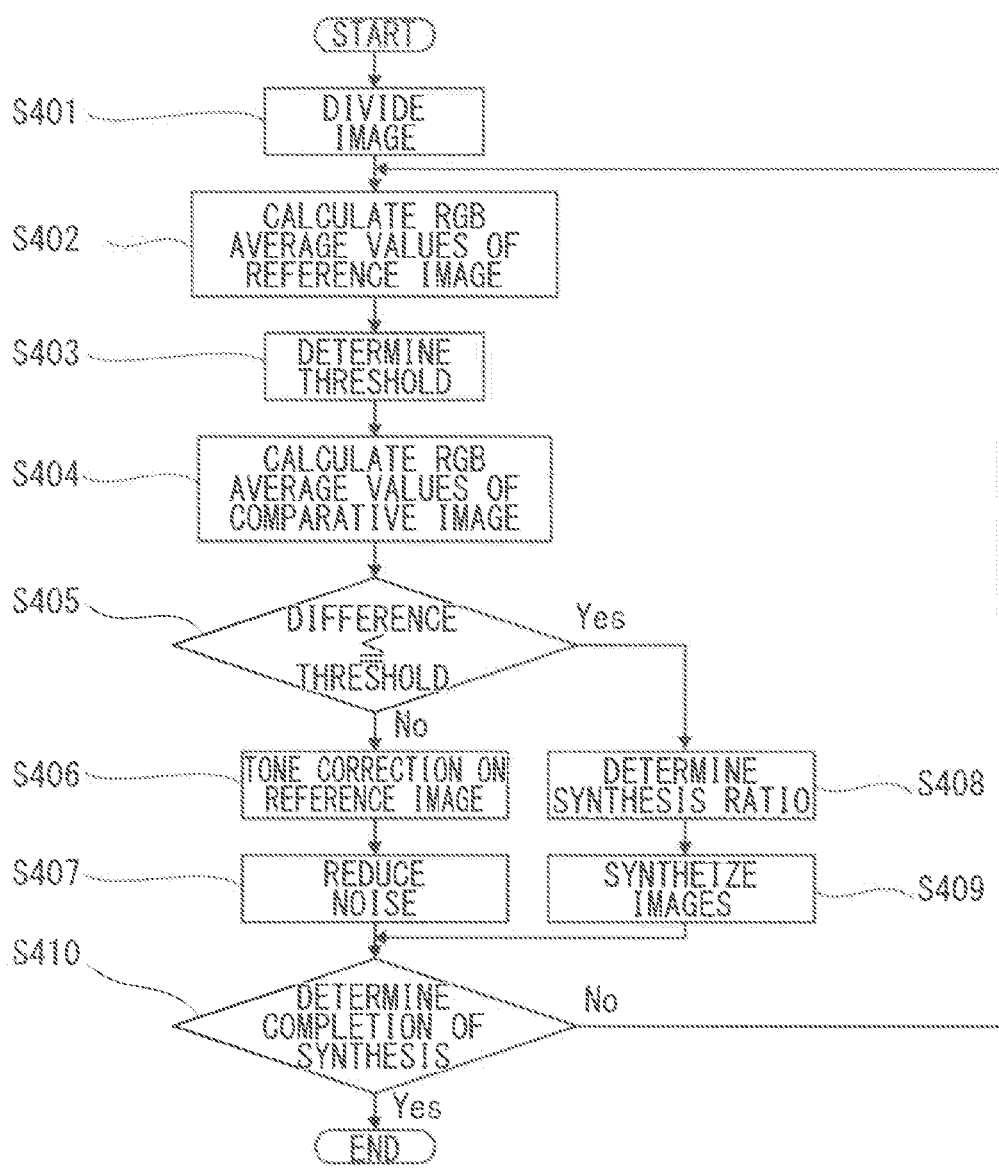
FIG. 8 is a flowchart for determining image synthesis in the image processing method by way of example.

An example of the synthesis determination in step S40 is described in detail with reference to a flowchart in FIG. 8. In step S401 the image divider 103 divides the reference image, non-reference image and comparative image into image blocks of a predetermined size. The smaller the size of the image blocks, the higher the accuracy at which a moving subject in an image is detected and the higher the quality of a synthesized image. Particularly, the image processing unit is configured to change the synthesis ratio on an image block basis so that degradation of image is reduced along with the size reduction of the image blocks. However, there is a drawback that as the size of the image blocks decreases, the amount of calculation and the processing time increases. According to the present embodiment the size of the image blocks are preset optimally to 32 pixels by 32 pixels for example with the balance of the processing time and the quality of the synthesized image taken into consideration. Herein, it is assumed that a single image is divided into the number M of image blocks.

Each divided image block is subjected to a series of processing to determine whether it contains a moving subject. First, in step S402 the average calculator 104 calculates the respective averages of output values of R pixels, G pixels, B pixels (hereinafter, RGB average values) of the k-th image block of the reference image to determine the threshold for synthesis determination. k is a value from 1 to M. In the first processing k is 1 and the RGB average values of the first image block are calculated. The number of pixels included in an image block of 32 pixels by 32 pixels, for example, is the sum of 256 each of R and B pixels and 512 of G pixels. The RGB average values are calculated by dividing the sums of the RGB pixel output values by the numbers of RGB pixels, respectively.

With use of an image sensor in Bayer pattern in the imaging unit 11, G pixels Gr in RG array and G pixels Gb in GB array need to be distinguished, which is not necessary in the image processing unit according to the present embodiment. However, RGr and GbB can be distinguished to calculate the averages when the properties of Gr and Gb are greatly different, or with use of a four-color image sensor, the averages can be calculated for each of the four colors.

Next, in step S403 the threshold determiner 105 determines the threshold for determining the synthesis of the image block in question on the basis of the calculated RGB average values in step S402, referring to the threshold table stored in the work memory. The threshold is determined for each of R pixels, G pixels, B pixels. The RGB average values of a RAW image in 12 bit are from 0 to 4,095 so that the number of thresholds is 4,096. That largely occupies the memory area. In the present embodiment, therefore, the representative differences and corresponding thresholds are stored in the work memory, and thresholds are calculated by interpolation from averages approximate to the calculated averages in step S402 as shown in FIG. 6B.

In step S404 the average calculator 104 calculates the RGB average values of the k-th image block of the comparative image. At k being 1 in the first processing, the RGB average values of the first image block are calculated.

In step S405 the synthesis determiner 106 calculates differences in the RGB average values of the reference image and the comparative image and compares the differences with the determined thresholds (Th_R[k], Th_G[k], Th_B[k]) in step S403.

Figure 9:
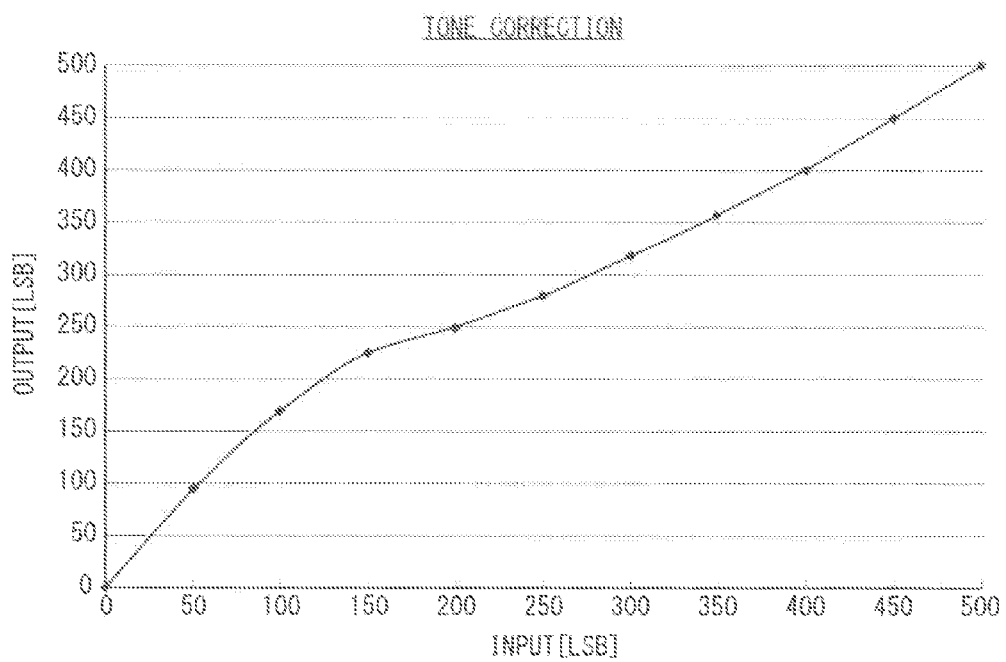
FIG. 9 is a chart showing an example of tone correction used in the image processing method.

When all the differences are larger than the thresholds in step S405, it is determined that the image block in question includes a moving subject, therefore, it is not suitable for synthesis (No in step S405). The image block of the reference image determined as unsuitable for synthesis is subjected to tone correction by the tone corrector 113 in step S406. The tone correction needs to be performed in line with a mix ratio as shown in FIG. 9 in order to prevent generation of an image having a locally unnatural portion.

In step S407 the noise reducer 114 reduces noise in a dark portion of the image block in question when necessary in order to prevent degradation of the image quality due to noise.

When all the differences are smaller than the thresholds in step S405, it is determined that the image block in question does not include a moving subject, therefore, it is suitable for synthesis (Yes in step S405). The ratio determiner 112 determines a synthesis ratio for the image block determined as suitable for synthesis in accordance with the averages of the image block of the reference image in step S408. The synthesis ratio is determined for each image block of the reference image and the non-reference image with reference to a synthesis ratio table. The synthesis ratio table contains values of synthesis ratio which are set in accordance with the pixel output values of the reference image so that the higher the pixel output value, the lower the synthesis ratio as shown in FIG. 10.

Figure 10:
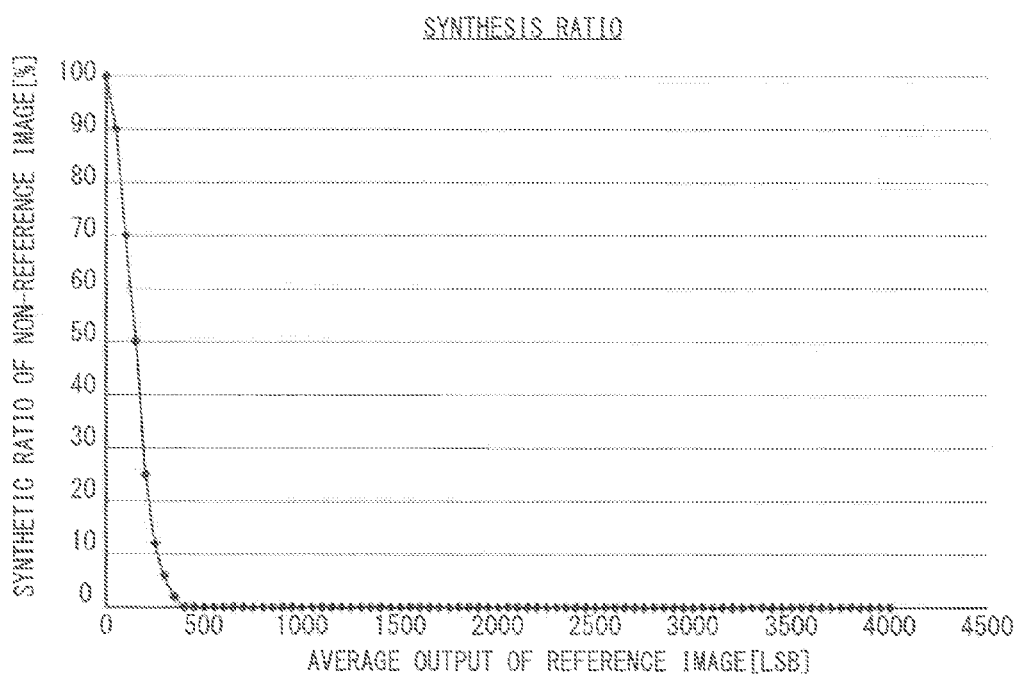
FIG. 10 is a chart showing an example of synthesis ratio used in the image processing method.

In the present embodiment a higher synthesis ratio is set for a dark portion, of an image block of the reference image, with a low pixel output value so as to increase the pixel output value, as shown in FIG. 10. Since the non-reference image has twice the brightness of the reference image, it is possible to expand the dynamic range of a synthesized image at such a synthesis ratio set as above. Further, a lower synthesis ratio is set for a portion with an intermediate pixel output value and a bright portion with a high pixel output value so that the image block in question of the reference image is synthesized without a change.

In step S409 the image synthesizer 107 synthesizes the image block of the reference image and the image block of the non-reference image at the determined synthesis ratio.

In step S410 a determination is made on whether or not all the image blocks of the reference image and the comparative image are subjected to the synthesis determination. With any image blocks remaining to be subjected to the synthesis determination, the processing from step S402 to step S409 is repeated for the image blocks (No in step S410). With all the image blocks having been subjected to the synthesis determination, the synthesizing process ends.

According to the image processing method in the present embodiment, the suitability for image synthesis is determined by calculating the differences in the RGB average values of the reference image and the comparative image to compare the differences with predetermined thresholds. Alternatively, various kinds of synthesis determination are conducted other than the one above.

For example, average brightness values of the reference image and the comparative image are used for the synthesis determination instead of the RGB average values. Using the average brightness values, the comparison with the thresholds in step S405 can be processed at a higher speed than using the RGB average values, contributing to a reduction in the total process time for the synthesis process.

As described above, the image processing method according to the present embodiment can synthesize images with different exposures to generate clear images with low noise, without synthesizing an image including a moving subject. Further, it can generate images with good tone representation (dynamic range) by determining different synthesis ratios for dark to bright portions of an image and synthesizing images at the determined synthesis ratio.

According to the present embodiment, it is possible to achieve a good balance between the dynamic range expansion and the synthesis of images including a moving subject and correct ghosts or noise in a synthesized image due to the image synthesis.

According to the present embodiment, by determining a synthesis ratio for each small image block of an arbitrary size, it is possible to perform different dynamic range expansion for dark and bright portions of an image to be synthesized.

The image processing method according to the present embodiment is applicable to image processing software operating on a personal computer other than an imaging device.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is clamed is:

1. An image processing unit comprising:
   a memory unit in which continuously captured images including a reference image and a non-reference image are stored;
   a comparative image generator configured to generate a comparative image from the non-reference image on the basis of photographic control data on the reference image and photographic control data on the non-reference image;
   an image divider configured to divide each of the reference image, non-reference image, and previously generated comparative image into image blocks of a predetermined size;
   a motion data calculator configured to calculate motion data between the reference image and the previously generated comparative image for associating the image blocks of the reference image with the image blocks of the previously generated comparative image;
   an average calculator configured to calculate an average of pixel output values for each image block of the reference image and for each image block of the previously generated comparative image associated with each other by the motion data;
   a threshold determiner configured to determine, on the basis of the average of pixel output values of an image block of the reference image, a threshold used for determining whether or not the image block of the reference image and an image block of the non-reference image are suitable for image synthesis;
   a synthesis determiner configured to compare the threshold for the image block of the reference image to be synthesized with a difference in averages of the pixel output values between the image block of the reference image and the image block of the previously generated comparative image, and determine, on the basis of a result of the comparison between the threshold for the image block of the reference image to be synthesized and the difference in averages of the pixel output values between the image block of the reference image and the image block of the previously generated comparative image, whether or not the image block of the reference image and the image block of the non-reference image are suitable for image synthesis; and
   a ratio determiner configured to determine, on the basis of the average of the pixel output values of the image block of the reference image, a ratio of synthesis of the image blocks of the reference image and non-reference image determined as suitable for image synthesis.

2. The image processing unit according to claim 1, further comprising
   a tone corrector configured to correct tone of the image block of the reference image determined as unsuitable for image synthesis by the synthesis determiner.

3. The image processing unit according to claim 2, further comprising
   a noise reducer configured to reduce noise in the tone-corrected image block.

4. The image processing unit according to claim 1, wherein:
   the average calculated by the average calculator is an average of outputs of each of R pixels, G pixels and B pixels included in each image block;
   the threshold determiner is configured to determine the threshold on the basis of a largest one of averages of the outputs of the respective RGB pixels included in each image block.

5. The image processing unit according to claim 1, wherein the average calculated by the average calculator is an average of brightness of the pixels included in each image block.

6. The image processing unit according to claim 1, wherein the threshold determiner is configured to determine a different threshold in accordance with ISO sensitivity.

7. The image processing unit according to claim 1, wherein the synthesis determiner is configured to determine that the image block of the reference image and the image block of the non-reference image are suitable for image synthesis when the difference in the averages is smaller than the threshold.

8. The image processing unit according to claim 1, further comprising
an image synthesizer configured to synthesize, at the determined ratio, the image blocks of the reference image and non-reference image determined as suitable for image synthesis by the synthesis determiner.

9. An image processing method comprising the steps of:
storing continuously captured images including a reference image and a non-reference image;
generating a comparative image from the non-reference image on the basis of photographic control data on the reference image and photographic control data on the non-reference image;
dividing each of the reference image, non-reference image, and previously generated comparative image into image blocks of a predetermined size;
calculating motion data between the reference image and the previously generated comparative image for associating the image blocks of the reference image with the image blocks of the previously generated comparative image;
calculating an average of pixel output values for each image block of the reference image and for each image block of the previously generated comparative image;
determining, on the basis of the average of pixel output values of an image block of the reference image, a threshold used for determining whether or not the image block of the reference image and an image block of the non-reference image are suitable for image synthesis;
comparing the threshold for the image block of the reference image to be synthesized with a difference in the averages of the pixel output values between the image block of the reference image and the image block of the previously generated comparative image, and determining, on the basis of a result of the comparison between the threshold for the image block of the reference image to be synthesized and the difference in averages of the pixel output values between the image block of the reference image and the image block of the previously generated comparative image, whether or not the image block of the reference image and the image block of the non-reference image are suitable for image synthesis; and
determining, on the basis of the average of the pixel output values of the image block of the reference image, a ratio of synthesis of the image blocks of the reference image and non-reference image determined as suitable for image synthesis.

10. The image processing method according to claim 9, further comprising the step of
correcting tone of the image block of the reference image determined as unsuitable for image synthesis.

11. The image processing method according to claim 9, wherein
the average calculated is an average of outputs of each of R pixels, G pixels and B pixels included in each image block, the method further comprising the step of
determining the threshold on the basis of the average of the outputs of each of the RGB pixels.

12. The image processing unit according to claim 9, wherein
the average calculated is an average of outputs of each of R pixels, G pixels and B pixels included in each image block, the method further comprising the step of
determining the threshold on the basis of a largest one of the averages of the outputs of the respective RGB pixels.

13. The image processing method according to claim 9, wherein
the average calculated is an average of brightness of the pixels included in each image block.

14. The image processing method according to claim 9, further comprising the step of
determining a different threshold in accordance with ISO sensitivity.

15. The image processing method according to claim 9, further comprising the step of
determining that the image block of the reference image and the image block of the non-reference image are suitable for image synthesis when the difference in the averages is smaller than the threshold.

16. The image processing method according to claim 9, further comprising the step of
synthesizing the image blocks of the reference image and non-reference image at the determined synthesis ratio when determined as suitable for image synthesis in the determining step.

17. A non-transitory computer readable medium having stored thereon an image processing program that when executed by a computer causes the computer to implement an image processing method comprising the steps of:
storing continuously captured images including a reference image and a non-reference image;
generating a comparative image from the non-reference image on the basis of photographic control data on the reference image and photographic control data on the non-reference image;
dividing each of the reference image, non-reference image, and previously generated comparative image into image blocks of a predetermined size;
calculating motion data between the reference image and the previously generated comparative image for associating the image blocks of the reference image with the image blocks of the previously generated comparative image;
calculating an average of pixel output values for each image block of the reference image and for each image block of the previously generated comparative image;
determining, on the basis of the average of pixel output values of an image block of the reference image, a threshold used for determining whether or not the image block of the reference image and an image block of the non-reference image are suitable for image synthesis;
comparing the threshold for the image block of the reference image to be synthesized with a difference in the averages of the pixel output values between the image block of the reference image and the image block of the previously generated comparative image, and determining, on the basis of a result of the comparison between the threshold for the image block of the reference image to be synthesized and the difference in averages of the pixel output values between the image block of the reference image and the image block of the previously generated comparative image, whether or not the image block of the reference image and the image block of the non-reference image are suitable for image synthesis; and determining, on the basis of the average of the pixel output values of the image block of the reference image, a ratio of synthesis of the image blocks of the reference image and non-reference image determined as suitable for image synthesis.

18. The image processing unit according to claim 1, wherein the comparative image generator is further configured to generate the comparative image from the non-reference image by modifying characteristics of the non-reference image such that the comparative image and the non-reference image have different characteristics, the modification of the characteristics being performed on the basis of the photographic control data on the reference image and the photographic control data on the non-reference image.

* * * * *